United States Patent Office 2,996,470
Patented Aug. 15, 1961

2,996,470
GRAFT COPOLYMER OF VINYL CHLORIDE POLYMER COMPOSITION, LATEX THEREOF, METHOD OF MAKING, AND ARTICLE COATED THEREWITH
Albert J. Cole and Floyd L. Edris, Pottstown, Pa., assignors to The Firestone Tire & Rubber Company, Akron, Ohio, a corporation of Ohio
No Drawing. Filed May 14, 1958, Ser. No. 735,136
7 Claims. (Cl. 260—29.7)

This invention relates to coatings based on vinyl chloride polymers, and more particularly to latex compositions from which hard, transparent, cohesive and tightly adherent coatings of this material can be laid down on metal and other substrates.

Vinyl chloride resins have many properties—hardness, transparency, chemical- and age-resistance, etc.—ideally adapting them for coatings on metal, wood, plastics and the like. A considerable volume of these resins are in fact employed in solvent coating compositions. However, it would be highly desirable to provide coatings of this type which can be laid down from aqueous media, so as to avoid the inconvenience and expense of solvents. Particularly desirable would be coatings which can be deposited from aqueous media to form strongly adhesive coatings upon steel and other metals. It is known that latices of vinyl chloride resins may be blended with latices of butadiene-acrylonitrile elastomers, and that more-or-less plasticized and coherent films may be laid down from the blended latices. However, the amount of the elastomer latex necessary to secure a given degree of clarity and cohesiveness of the deposited film invariably produces a softening of the film which is excessive in relation to the degree of clarity and coherence attained.

Accordingly, it is an object of this invention to provide novel and improved coatings and coating compositions based on vinyl chloride resins.

Another object is to provide such coatings in the form of aqueous dispersions or latices.

A further object is to provide such coatings which will combine clarity and cohesiveness on the one hand, together with a high degree of hardness and toughness on the other hand.

A still further object is to provide such coatings which will form tightly adherent, impervious coatings on steel, aluminum and other metals for metal furniture, integral-coated drawing and forming sheet, and the like.

SYNOPSIS OF THE INVENTION

The above and other objects are secured, in accordance with this invention, in latices of vinyl chloride resins upon which have been graft copolymerized mixtures of butadiene and/or its homologs, acrylonitrile and/or its homologs, and an acidic monomer such as methacrylic acid. In a latex according to this invention, the percentages of the several components should be as follows:

| I. A vinyl chloride resin base | | | | | Based on the weight of I plus II. |
|---|---|---|---|---|---|
| II. A grafted mixture of: | | | | 60-80% | |
| (a) A diene, e.g. butadiene, its homologs or a mixture of two or more thereof. | 65-85% | Based on the weight of II(a) plus II(b) exclusive of II(c). | | | |
| (b) An acrylonitrile, e.g. acrylonitrile itself, its homologs or a mixture of two or more thereof. | 35-15% | | 40-20% | | |
| (c) An acidic monomer, such as methacrylic acid or the like. | 1-10% | | | | |

Preferably by far, the emulsifying agent employed in the original polymerization of the vinyl chloride resin latex should be an alkylated aromatic hydrocarbon sulfonate, and the grafting of the mixture should be carried out without adding any supplemental peroxidic catalysts other than those used in the original polymerization of the vinyl chloride resin in the latex. Films laid down from the latices of this invention when dried at moderate temperatures on the order of 4°–98° C., yield films which are hard, coherent, and tough, but which are nevertheless desirably clear and transparent. The films are impervious and tightly adherent to steel and other metals, and are admirably suited for protective coatings on metal furniture, automobiles, and the like.

THE VINYL CHLORIDE RESIN SUBSTRATE

Generally, the vinyl chloride polymer of the substrate is a vinyl chloride homopolymer, but up to 20% of the comonomers, based on the weight of the final resultant vinyl chloride copolymer, may be used in producing the vinyl chloride resin of the substrate. Monomers which are suitable for producing copolymers with vinyl chloride are well known and include, for instance, vinylidene chloride, vinyl acetate, vinyl stearate, styrene, acrylic and methacrylic esters such as methyl methacrylate, ethyl methacrylate, propyl methacrylate, butyl methacrylate, octyl methacrylate, dodecyl methacrylate, and the like, methyl acrylate, ethyl acrylate, propyl acrylate, butyl acrylate, octyl acrylate, dodecyl acrylate and the like, alkyl fumarates, alkyl maleates and the like, acrylonitrile, vinyl-type ethers and ketones such as methyl vinyl ether, methyl vinyl ketone and related compounds such as methyl isopropenyl ketone and the like. A more complete listing of suitable comonomers useful for polymerizing with vinyl chloride to produce latices used in this invention is found in Krczil "Kurzes Handbuch der Polymerisationstechnik — II Mehrstoff-Polymerisation," Edwards Bros. Inc., 1945, pp. 735–37, the items under "Vinyl chlorid."

It is important that the vinyl chloride be polymerized in a system that will constitute a true emulsion polymerization system so as to yield a true latex. To this end, the emulsifying agent employed should be of the micelle-forming type, and the catalyst employed should be of the water soluble peroxidic type. In general the micelle-forming emulsifying agents are compounds containing hydrocarbon groups of from 5 to 22 carbon atoms coupled to highly polar solubilizing groups such as alkali metal and ammonium carboxylate groups, sulfate half-ester groups, sulfonate groups, phosphate partial ester groups and the like. Exemplary emulsifying agents include sodium oleate, sodium stearate, sodium caproate, the sodium salts of the sulfate half-esters of fatty alcohols produced by the reduction of the fatty acids of natural oils such as coconut oil, sodium abietate, sodium salts of sulfosuccinic esters such as sodium dioctyl sulfosuccinate, sodium salts of alkylated benzene and naphthalene sulfonic acids such as sodium dodecyl naphthalene sulfonate, sodium sulfonate of benzene alkylated with polyisopropylene, sodium salts of sulfated fatty monoglycerides, and the like. It is by far preferable to use the sulfonates of alkylated benzene or naphthalene, because these emulsifiers give latices of improved mechanical stability and also make it possible to conduct the graft copolymerization step without the addition of further emulsifiers. The polymerization medium will contain a suitable water-soluble free radical generating catalyst such as hydrogen peroxide, potassium or sodium persulfates, perborates, peracetates, percarbonates and the like, which catalysts may be associated with activating systems such as redox systems involving versivalent metals and mild reducing agents. Polymerization is effected by agitating the monomers, emulsifying agents and catalysts in sufficient water (say 45% or more by weight of the monomers) to effect emulsification, and adjusting the temperature to from about 40° C. to about 100° C., or, in the case of activated systems, from 0° C. to 80° C. The polymerization will usually be carried to the extent of at least about 75% before the to-be-grafted mixture is added. Any unreacted monomers are optionally, and preferably, stripped off before the to-be-grafted monomers are added for polymerization; the butadiene would, in any event, interfere with any further polymerization of the vinyl chloride.

THE GRAFTING OF THE BUTADIENE-ACRYLO-NITRILE-ACRYLIC ACID MIXTURE

To the latex prepared as just described, there is added a mixture of butadiene (and/or one or more homologs thereof), acrylonitrile (and/or one or more homologs thereof) and an acidic monomer in amounts such that the ratio of the weight of vinyl chloride polymer or copolymer in the latex to that of the added mixture will be from 60/40 to 80/20 inclusive, and preferably about 65/35. Homologs of butadiene include for instance isoprene, 2,3-dimethylbutadiene, piperylene and the like, and homologs of acrylonitrile include for instance methacrylonitrile, 1-ethyl acrylonitrile and the like. Acidic monomers include compounds having a polymerizable ethylenic group and a carboxylic acid group, examples of these compounds being acrylic acid, methacrylic acid, ethacrylic acid, maleic acid, fumaric acid, monoalkyl monohydrogen maleates and fumarates such as methyl, ethyl, propyl and butyl acid maleate, and the free acids, and mono-methyl, -ethyl, -propyl and -butyl monohydrogen esters corresponding to the anhydrides provided by the Diels-Alder condensation of maleic or chloromaleic acid with butadiene, cyclopentadiene or other conjugated dienes. It will be understood that the butadiene and its homologs may be used individually alone, or in any mixture of two or more thereof; that the acrylonitrile and its homologs may be used individually alone or in any mixture of two or more thereof; and that the acidic monomer need not be a single compound, but may be a mixture of two or more of the compounds above indicated as suitable in this connection. The total amount of the mixture added should be such that the ratio of the weight of butadiene (and/or homologs) to the weight of acrylonitrile (and/or homologs) therein is from 65/35 to 80/20 inclusive, and preferably 70/30. In the mixture, the ratio of the weight of the acidic monomer to the total of the weights of butadiene (and/or homologs) and acrylonitrile (and/or homologs) should be from 1/100 to 10/100 inclusive, and preferably 6/100. It is desirable to continue the polymerization without addition of any further catalyst. In the particular system polyvinyl chloride-butadiene/acrylonitrile superstrate involved in the present invention, further addition of catalyst is unnecessary to produce polymerization of the added monomers, and introduces a tendency towards pre-coagulation of the latex and impairment of the heat- and light-aging properties, and electrical characteristics of the resin. In addition, there is evidence that the character of the polymerization is different when no catalyst is added; it is surmised that, when no catalyst is added, no fresh growing chains of polymer are created, so that further polymerization takes place by way of continued lengthwise growth of the established polymeric chains, rather than by way of lateral attachment of side chains. At any rate, the general performance of the latex and the resulting coatings is improved when the grafting operation is carried out without the addition of supplemental catalyst. Also, it is desirable that there be added a mercaptide-type chain-transfer agent to the reaction mixture during the grafting reaction in order to expedite initiation of the grafting reaction and also to regulate the hardness of the final product. The grafting is effected by adjusting the temperature to the polymerization range (if it is not already in that range) i.e., 40°–100° C. in the case of unactivated, and 0°–100° C. in the case of activated systems. When the required amount of the grafted monomers has reacted, any excess of monomers are blown off. The resultant latex is then ready for use in coating or other applications.

FORMATION OF COATINGS FROM THE GRAFT COPOLYMERS

The primary use of the graft copolymers of this invention is for the formation of hard, coherent, tightly adherent, impervious, smooth and clear coatings on a variety of surfaces, such as steel, aluminum, magnesium, zinc and other metals; linoleum; asphalt, vinyl, and other composition floor tiles; wood; asbestos board; rubber, masonry products such as concrete, brick, or plaster; composition building board, and in the impregnation of porous materials such as paper, felt, etc. The coatings are applied by dipping, spraying, brushing, flow-coating, roller coating or similar processes, using the liquid latices produced as above described. The coatings are then dried in the air or other gaseous medium at temperatures on the order of 4–98° C. The resultant films are hard, tough, coherent, and impervious, and adhere well to the surfaces to which they are applied. This is particularly true of steel and other metals to which the coatings of this invention are applied; the coatings have been found very suitable for difficult applications such as metal furniture which will be exposed to outdoor conditions, where a very high degree of imperviousness, adhesion to the metal, and resistance to abrasion is absolutely necessary. As compared with the most nearly analogous previously known compositions, namely blends of separately-prepared latices of vinyl chloride resins and butadiene-acrylonitrile elastomers, for any given gross elemental composition of the elements of vinyl chloride, butadiene and acrylonitrile, the films produced in accordance with this invention are much smoother, clearer and more transparent. Also, it is possible, with the graft latices of this invention to obtain coherent films with a much lower content of butadiene and acrylonitrile, and consequently to obtain much harder films, than is possible with the simple blended latices of the prior art.

With the foregoing general discussion in mind, there are given herewith detailed examples for the practice of this invention. All parts and percentages given are by weight.

EXAMPLE

| | Parts |
|---|---|
| (A) Preparation of substrate latex: | |
| Vinyl chloride | 65.0 |
| Alkylated benzene sulfonate | 5.0 |
| Potassium persulfate | 0.2 |
| Water (deionized) | 65.0 |
| (B) Grafted monomers: | |
| Latex from ingredients listed at "A" | Entire batch |
| Butadiene | 24.5 |
| Acrylonitrile | 10.5 |
| Methacrylic acid | 2.0 |
| Dodecyl mercaptan | .05 |

A reactor having a rotary stirrer and heating and cooling jacket was provided for the preparation of the substrate latex. The ingredients listed at "A," with the exception of the vinyl chloride, were charged at 25° C., and the stirrer set in motion to dissolve the ingredients together. The free space in the reactor was then evacuated and purged with vinyl chloride vapor, and the vinyl chloride of the recipe pressured in. The temperature was then raised to 45° C., with agitation intensity, on the Pfaudler scale, of 1.5, the agitation being continued throughout the reaction to follow. These conditions were maintained for a total of 24 hours, at the end of which time the unreacted vinyl chloride was vented. The materials listed at "B" were then charged, and the temperature raised once more to 65° C., which temperature and agitation at 1.5 on the Pfaudler scale were maintained for an additional 24 hours. The unreacted monomers were then vented, and the resultant latex cooled to 25° C.

The resultant latex was admirably adapted for coating purposes, and particularly for the coating of metals. For instance, steel furniture was coated with this latex with a pickup of $2.6 \times 10^{-3}$ grams of latex per sq. cm., and heated in an oven at 70° C. for 45 minutes. The coated furniture withstood all of the usual handling, storing, weather exposure and use for both indoor and outdoor service without deterioration of the metal or coating.

The latex had excellent mechanical stability, withstanding thirty minutes in a shaking apparatus without any flocculation. In order to evaluate the behavior of the films on aging, glass slides were dipped into the latex, and the adherent film dried at 50° C. for 1 hour and stripped off. Specimens of the film were aged in an oven at 100° C. for varying periods of time. The tensile strength and elongation of the specimens are tabulated herewith.

TABLE I

| Hours Exposure in Oven | 0 | 1 | 3 | 17 |
|---|---|---|---|---|
| Tensile Strength (pounds/sq. in.) | 1,181 | 2,697 | 2,300 | 2,275 |
| Elongation at Break (Percent) | 63 | 147 | 78 | 45 |

From the foregoing general discussion and detailed example, it will be evident that this invention provides novel graft copolymers, and latices thereof, suitable for a wide variety of coating operations. The latex products have the particularly novel feature of forming hard, coherent, impervious and tightly adhesive coatings on steel and other metals.

What is claimed is:

1. A graft copolymer of

| I. A vinyl chloride resin | 60–80% | based on the weight of I plus II. |
|---|---|---|
| and | | |
| II. A butadiene-acrylonitrile-acidic monomer-type mixture. | 40–20% | | said vinyl chloride resin being selected from the group consisting of homopolymers of vinyl chloride and copolymers thereof with up to 20% of other ethylenically unsaturated compounds copolymerizable therewith, and said butadiene-acrylonitrile-acidic-monomer-type mixture being a mixture of

| II(a). A diene selected from the group consisting of butadiene, isoprene, 2,3-dimethyl butadiene and piperylene. | 65–85% | based on the weight of II(a) plus II(b) exclusive of II(c). |
|---|---|---|
| II(b). A nitrile selected from the group consisting of acrylonitrile, methacrylonitrile and alphaethyl acrylonitrile. | 35–15% | |
| II(c). An acidic monomer having a polymerizably reactive ethylenic group and a carboxylic acid group. | 1–10% | |

2. A graft copolymer of (I) a homopolymer of vinyl chloride and (II) a mixture of butadiene, acrylonitrile and methacrylic acid, the weight ratio of (I) the homopolymer to (II) the mixture being from 60/40 to 80/20, the weight ratio of the butadiene to acrylonitrile in said mixture (II) being from 65/35 to 80/20, and the ratio of the weight of methacrylic acid to the sum of the weights of butadiene and acrylonitrile being from 1/100 to 10/100.

3. A hard, tough, adherent coating firmly adhered to a steel substrate, said coating comprising a graft copolymer of (I) a homopolymer of vinyl chloride and (II) a mixture of butadiene, acrylonitrile and methacrylic acid, the weight ratio of (I) the homopolymer to (II) the mixture being from 60/40 to 80/20, the weight ratio of the butadiene to acrylonitrile in said mixture (II) being from 65/35 to 80/20, and the ratio of the weight of methacrylic acid to the sum of the weights of butadiene and acrylonitrile being from 1/100 to 10/100.

4. A latex of a graft copolymer of (I) a polymeric material selected from the group consisting of homopolymers of vinyl chloride and copolymers thereof with up to 20% of other ethylenically unsaturated compounds copolymerizable therewith, and (II) a mixture of butadiene, acrylonitrile and methacrylic acid, the weight ratio of (I) the polymeric material to (II) the mixture being from 60/40 to 80/20, and the weight ratio of the butadiene to acrylonitrile in said mixture (II) being from 65/35 to 80/20, and the ratio of the weight of methacrylic acid to the sum of the weights of butadiene and acrylonitrile being from 1/100 to 10/100.

5. A latex of a graft copolymer of (I) a homopolymer of vinyl chloride, and (II) a mixture of butadiene, acrylonitrile and methacrylic acid, the weight ratio of (I) the homopolymer to (II) the mixture being from 60/40 80/20, and the weight ratio of the butadiene to acrylonitrile in said mixture (II) being from 65/35 to 80/20, and the ratio of the weight of methacrylic acid to the sum of the weights of butadiene and acrylonitrile being from 1/100 to 10/100.

6. Process which comprises polymerizing, by heating at 40° to 100° C., (I) a monomeric material selected from the group consisting of vinyl chloride and mixtures thereof with up to 20% of other ethylenically unsaturated monomers copolymerizable therewith, in emulsion in an aqueuos medium containing a micelle-forming emulsifying agent containing hydrocarbon groups of 5–22 carbon atoms coupled to highly polar solubilizing groups, and a water-soluble free-radical polymerization catalyst to yield a latex of polymerized monomeric material, adding, to the latex, (II) a mixture of butadiene, acrylonitrile and methacrylic acid and maintaining the temperature of the reaction mass at 40° to 100° C. to polymerize the resulting mixture, the weight ratio of the vinyl chloride polymer to the mixture of butadiene, acrylonitrile and methacrylic acid being from 60/40 to 80/20, the weight ratio of butadiene to acrylonitrile in said mixture being from 65/35 to 80/20, and the ratio of the weight of methacrylic acid to the sum of the weights of butadiene and acrylonitrile in said mixture being from 1/100 to 10/100.

7. Process which comprises polymerizing, by heating at 40° to 100° C., (I) a monomeric material selected from the group consisting of vinyl chloride and mixtures thereof with up to 20% of other ethylenically unsaturated monomers copolymerizable therewith, in emulsion in an aqueous medium containing a micelle-forming emulsifying agent containing hydrocarbon groups of 5–22 carbon atoms coupled to highly polar solubilizing groups and a water-soluble free-radical polymerization catalyst to yield a latex of polymerized monomeric material, adding, to the latex, (II) a mixture of butadiene, acrylonitrile and methacrylic acid and maintaining the temperature of the reaction mass at 40° to 100° C. to polymerize the resulting mixture, the catalyst used in the polymerization of the monomeric material (I) being the sole polymerization catalyst used in the polymerization of the said resulting mixture, the weight ratio of the polymer of the monomeric material to the mixture of butadiene and acrylonitrile being from 60/40 to 80/20, the weight ratio of butadient to acrylonitrile in said mixture being from 65/35 to 80/20, and the ratio of the weight of methacrylic acid to the sum of the weights of butadiene and acrylonitrile in said mixture being from 1/100 to 10/100.

References Cited in the file of this patent
UNITED STATES PATENTS

| | | |
|---|---|---|
| 2,512,697 | Te Grotenhuis | June 27, 1950 |
| 2,614,089 | Harrison et al. | Oct. 14, 1952 |
| 2,816,087 | Coover | Dec. 10, 1957 |
| 2,851,372 | Kaplan et al. | Sept. 9, 1958 |

OTHER REFERENCES

Whitby et al.: "Synthetic Rubber," p. 630, Wiley & Sons, New York.